(12) United States Patent
Kusatsugu

(10) Patent No.: US 8,340,514 B2
(45) Date of Patent: Dec. 25, 2012

(54) OPENING/CLOSING MECHANISM FOR COVER AND IMAGING DEVICE

(75) Inventor: Takashi Kusatsugu, Aichi (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 12/801,227

(22) Filed: May 28, 2010

(65) Prior Publication Data

US 2010/0325961 A1 Dec. 30, 2010

(30) Foreign Application Priority Data

Jun. 24, 2009 (JP) ................. 2009-149890

(51) Int. Cl.
  *G03B 17/02* (2006.01)
  *G03B 11/04* (2006.01)
  *H04N 5/225* (2006.01)
  *G02B 23/16* (2006.01)
  *E05D 15/22* (2006.01)
(52) U.S. Cl. ........ 396/535; 396/448; 348/373; 359/511; 49/150
(58) Field of Classification Search .................. 396/448, 396/535, 536, 539; 348/373; 359/511; 206/316.1, 206/316.2, 468; 49/150
See application file for complete search history.

(56) References Cited

U.S. PATENT DOCUMENTS

| 4,096,506 | A | * | 6/1978 | Lange | 396/448 |
| 5,708,891 | A | * | 1/1998 | Ando et al. | 396/448 |
| 5,805,947 | A | * | 9/1998 | Miyamoto et al. | 396/448 |
| 6,135,652 | A | * | 10/2000 | Owashi et al. | 396/349 |
| 6,176,626 | B1 | * | 1/2001 | Bittner | 396/448 |
| 6,813,444 | B2 | * | 11/2004 | Inazuka et al. | 396/267 |
| 2002/0070587 | A1 | * | 6/2002 | Horiuchi et al. | 296/223 |
| 2009/0103914 | A1 | | 4/2009 | Kitagawa et al. | |

FOREIGN PATENT DOCUMENTS

JP  2009-098415  5/2009

* cited by examiner

*Primary Examiner* — Rochelle-Ann J Blackman
(74) *Attorney, Agent, or Firm* — Rader Fishman & Grauer, PLLC

(57) ABSTRACT

An opening/closing mechanism for a cover of an imaging device includes a cover that is moved between a closed position and an inclined position in such a manner that the cover is inclined with respect to an outer housing of an imaging device, is moved in a straight line with respect to the outer housing, and has a pressing operation portion and an portion to be locked, a slide base that supports the cover slidably between the inclined position and the open position, and has a locking portion which is engaged with the portion to be locked to lock the cover at the open position, and a tilting base that supports the slide base tiltably between an initial position and a tilted position. When the cover is placed at the closed position, the slide base is placed at the initial position.

7 Claims, 17 Drawing Sheets

OPENING/CLOSING MECHANISM FOR COVER AND IMAGING DEVICE

BACKGROUND OF THE INVENTION

1. Field of the Invention

The present invention relates to an opening/closing mechanism for a cover and an imaging device. More specifically, the present invention relates to a technical field of moving and opening/closing a cover in and out of an outer housing by pressing the cover in a predetermined direction to attain good operability and facilitate operation at the time of opening and closing the cover.

2. Description of the Related Art

There is a case where an openable/closable cover is provided in various imaging devices such as video cameras or still cameras.

In such an imaging device, the cover is slidable at a front surface of the outer housing to open or close a photograph lens or light emitting portion disposed at the front surface of the outer housing (e.g., refer to Japanese Unexamined Patent Application Publication No. 2009-98415 (corresponding to US2009-103914A1)).

SUMMARY OF THE INVENTION

However, in the imaging device disclosed in Japanese Unexamined Patent Application Publication No. 2009-98415 (corresponding to US2009-103914A1), since the cover is placed at the external side of the outer housing and a slide mechanism for sliding the cover is placed in the inside of the outer housing, the front surface of the outer housing is interposed between the cover and the slide mechanism.

Accordingly, when the cover slides, it may impede the smooth sliding operation of the cover since the cover and the slide mechanism are in a state in which they are slidable on the front surface of the outer housing.

In addition, in the sliding operation of the cover, for example, a two-way pressing operation, in which a top surface of the cover is pressed in a downward direction to open the cover and a bottom surface of the cover is pressed in an upward direction to close the cover, is necessary. In general, the upward and downward pressing operations are performed by using different fingers.

Consequently, since the user necessarily performs the pressing operation with different fingers in different directions at the time of opening and closing the cover, it is difficult to say that proper operability for the pressing operation is obtained.

Therefore, it is desired that an opening/closing mechanism and an imaging device of the cover according to an embodiment of the present invention is to attain good operability and facilitate operation at the time of opening and closing a cover in order to solve the above problem.

According to an embodiment of the present invention, there is provided an opening/closing mechanism for a cover including: a cover that is moved between a closed position and an inclined position in such a manner that the cover is inclined with respect to an outer housing of an imaging device, is operated in a straight line with respect to the outer housing, is moved between the inclined position and an open position, and has a pressing operation portion and an portion to be locked; a slide base that supports the cover slidably between the inclined position and the open position, and has a locking portion which is engaged with the portion to be locked to lock the cover at the open position; and a tilting base that supports the slide base tiltably between an initial position and a tilted position; wherein when the cover is placed at the closed position, the slide base is placed at the initial position; when the pressing operation portion of the cover is pressed in a predetermined pressing direction at the closed position, the slide base is moved to the tilted position, and simultaneously the cover is received in the outer housing through the inclined position, and then is moved to and locked at the open position; and when the pressing operation portion of the cover is pressed in the pressing direction at the open position, the locking portion is released, and the cover is moved to the closed position through the inclined position, and simultaneously the slide base is moved from the tilted position to the initial position.

Accordingly, in the opening/closing mechanism for the cover, when the cover is performed from the closed position to the open position or from the open position to the closed position, the cover is pressed in the same direction to move the cover in or out of the outer housing.

In the opening/closing mechanism for the cover, it is desirable that the opening/closing mechanism further includes a first biasing spring for biasing the slide base from the tilted position to the initial position, and a second biasing spring for biasing the cover from the open position to the closed position, in which resilience of the second biasing spring is higher than that of the first biasing spring.

Since the resilience of the second biasing spring is higher than that of the first biasing spring, the tilting operation of the cover and the slide base and the sliding operation of the cover are respectively performed.

In the opening/closing mechanism for the cover, it is desirable that the slide base is provided with a cam groove having the locking portion, the cover is provided with a cam arm having a cam engaging portion which is slidably engaged with the cam groove, and the cam arm is formed of a leaf spring having a biasing force in a direction of pressing the cam engaging portion toward the cam groove.

Since the cam arm is formed of a leaf spring having the biasing force in a direction of pressing the cam engaging portion toward the cam groove, the cam engaging portion is slid along the cam groove, with the cam engaging portion being pressed against the cam groove.

In the opening/closing mechanism for the cover, it is desirable that the opening/closing mechanism further includes a plurality of pivot arms connecting the cover and the slide base and rotatably supported on the slide base, in which the plurality of pivot arms is rotatably connected to each other, and when the pressing operation portion of the cover is pressed in the pressing direction, the plurality of pivot arms is synchronously rotated with respect to the slide base.

Since the plurality of pivot arms rotatably supported on the slide base is rotatably connected to each other, the pressure of the pressing operation portion can be easily and uniformly applied to the pivot arms.

In the opening/closing mechanism for the cover, it is desirable that the opening/closing mechanism further includes a plurality of pivot arms connecting the cover and the slide base and rotatably supported on the slide base, in which the plurality of pivot arms is rotatably connected to each other, the tilting base is fixed to the outer housing, the first biasing spring is supported between the tilting base and the slide base, and the second biasing spring is supported between the tilting base and the pivot arms.

Since the opening/closing mechanism for the cover has the above configuration, the slide base and the cover are operated by a simple mechanism.

In the opening/closing mechanism for the cover, it is desirable that the slide base is provided with a concave portion for operation which serves as a path of the pressing operation portion when the pressing operation portion is pressed and the cover is slid with respect to the slide base.

Since the concave portion for operation which serves as the path of the pressing operation portion is provided, it is possible to operate the cover in a state in which a finger is inserted into the concave portion for operation.

According to another embodiment of the present invention, there is provided an imaging device including an outer housing in which predetermined parts are placed; a cover that is moved between a closed position and an inclined position in such a manner that the cover is inclined with respect to the outer housing, is moved in a straight line with respect to the outer housing, and has a pressing operation portion and a portion to be locked moved between the inclined position and an open position; a slide base that supports the cover slidably between the inclined position and the open position, and has a locking portion which is engaged with the portion to be locked to lock the cover at the open position; and a tilting base that supports the slide base tiltably between an initial position and a tilted position; wherein when the cover is placed at the closed position, the slide base is placed at the initial position; when the pressing operation portion of the cover is pressed in a predetermined pressing direction at the closed position, the slide base is moved to the tilted position, and simultaneously the cover is received in the outer housing through the inclined position, and then is moved to and locked at the open position; and when the pressing operation portion of the cover is pressed in the pressing direction at the open position, the locking portion is released, and the cover is moved to the closed position through the inclined position, and simultaneously the slide base is moved from the tilted position to the initial position.

Accordingly, in the imaging device, when the cover is performed from the closed position to the open position or from the open position to the closed position, the cover is pressed in the same direction to move the cover in or out of the outer housing.

The opening/closing mechanism for a cover includes the cover that is moved between the closed position and the inclined position in such a manner that the cover is inclined with respect to an outer housing of an imaging device, is moved in a straight line with respect to the outer housing, and has the pressing operation portion and the portion to be locked between the inclined position and an open position; the slide base that supports the cover slidably between the inclined position and the open position, and has the locking portion which is engaged with the portion to be locked to lock the cover at the open position; and the tilting base that supports the slide base tiltably between the initial position and the tilted position; wherein when the cover is placed at the closed position, the slide base is placed at the initial position; when the pressing operation portion of the cover is pressed in a predetermined pressing direction at the closed position, the slide base is moved to the tilted position, and simultaneously the cover is received in the outer housing through the inclined position, and then is moved to and locked at the open position; and when the pressing operation portion of the cover is pressed in the pressing direction at the open position, the locking portion is released, and the cover is moved to the closed position through the inclined position, and simultaneously the slide base is moved from the tilted position to the initial position.

Accordingly, since the cover is moved from the closed position to the open position and thus is received in the outer housing, a front side portion of the outer housing does not exist between the cover and the slide base thereby to facilitate the operation of the cover.

In addition, since the movement of the cover between the open position and the closed position is usually performed by the pressing operation applied to the pressing operation portion in one direction, appropriate operability of the pressing operation can be attained.

In the present invention according to an embodiment, the first biasing spring for biasing the slide base from the tilted position to the initial position, and the second biasing spring for biasing the cover from the open position to the closed position are installed, in which the resilience of the second biasing spring is higher than that of the first biasing spring.

Therefore, after the operation of the slide base and the cover, the sliding operation of the cover can be reliably performed by the simple mechanism.

In the present invention according to another embodiment, the slide base is provided with the cam groove having the locking portion, the cover is provided with the cam arm having the cam engaging portion which is slidably engaged with the cam groove, and the cam arm is formed of the leaf spring having a biasing force in a direction of pressing the cam engaging portion toward the cam groove.

Accordingly, it is possible to prevent the cam engaging portion from being released from the cam groove.

In the present invention according to another embodiment, the opening/closing mechanism further includes the plurality of pivot arms connecting the cover and the slide base and rotatably supported on the slide base, in which the plurality of pivot arms is rotatably connected to each other, and when the pressing operation portion of the cover is pressed in the pressing direction, the plurality of pivot arms is synchronously rotated with respect to the slide base.

Accordingly, even though the pressing operation portion is formed at any position of the cover, the pressing force of the pressing operation portion is like to be uniformly applied to the pivot arms, thereby facilitating the operation of the slide base and the cover.

In the present invention according to another embodiment, the plurality of pivot arms connecting the cover and the slide base and rotatably supported on the slide base is installed, and in which pivot arms are rotatably connected to each other; the tilting base is fixed to the outer housing, the first biasing spring is supported between the tilting base and the slide base, and the second biasing spring is supported between the tilting base and the pivot arms.

Accordingly, the operation of the slide base and the cover can be easily and smoothly performed by the simple mechanism.

In the present invention according to another embodiment, the slide base is provided with the concave portion for operation which serves as a path of the pressing operation portion when the pressing operation portion is pressed and the cover is slid with respect to the slide base.

Accordingly, since the cover is operated in the state in which the finger is inserted into the concave portion for operation, the appropriate operability can be attained at the time of pressing the pressing operation portion.

According to another embodiment of the present invention, the imaging device includes the outer housing in which predetermined parts are placed; the cover that is moved between the closed position and the inclined position in such a manner that the cover is inclined with respect to the outer housing, is operated in a straight line with respect to the outer housing, is moved between the inclined position and an open position, and has the pressing operation portion and an portion to be locked; the slide base that supports the cover slidably between the inclined position and the open position, and has the locking portion which is engaged with the portion to be locked to lock the cover at the open position; and the tilting base that supports the slide base tiltably between the initial position and the tilted position; wherein when the cover is placed at the closed position, the slide base is placed at the initial position; when the pressing operation portion of the cover is pressed in a predetermined pressing direction at the closed position, the slide base is moved to the tilted position, and simultaneously the cover is received in the outer housing through the inclined position, and then is moved to and locked at the open position; and when the pressing operation portion of the cover is pressed in the pressing direction at the open position, the locking portion is released, and the cover is moved to the closed position through the inclined position, and simultaneously the slide base is moved from the tilted position to the initial position.

Accordingly, since the cover is moved from the closed position to the open position and thus is received in the outer housing, a front side portion of the outer housing does not exist between the cover and the slide base thereby to facilitate the operation of the cover.

In addition, since the movement of the cover between the open position and the closed position is usually performed by the pressing operation applied to the pressing operation portion in one direction, appropriate operability of the pressing operation can be attained.

DESCRIPTION OF THE PREFERRED EMBODIMENTS

An embodiment of the prevent invention will be described with reference to the accompanying drawings.

In the embodiment below, an imaging device of the present invention is applied to a digital still camera, and an opening/closing mechanism of the cover of the present invention is applied to an opening/closing mechanism for the cover provided in the digital still camera.

The scope of the embodiment of the invention is not limited to the digital still camera and the opening/closing mechanism of the cover provided in the digital still camera. The present invention is widely applicable to, for example, another imaging device such as a video camera or silver salt camera, an image camera attached to a portable telephone, or various imaging devices provided in an information processing apparatus such as a personal computer, a communication terminal device or a game console, and an opening/closing mechanism for the cover provided in these types of imaging devices.

In the following explanation, at the time of taking a picture of an object using a still camera, the respective directions of front and rear, up and down, and right and left are indicated as directions viewed from a photographer (user) side. Accordingly, a subject side is referred to as the front and the photographer side is referred to as the rear.

In this instance, the directions of front and rear, up and down, and left and right described below are only for convenience of explanation. In the application of the invention, directions are not limited to these directions.

[Whole Configuration]

Figure 1:
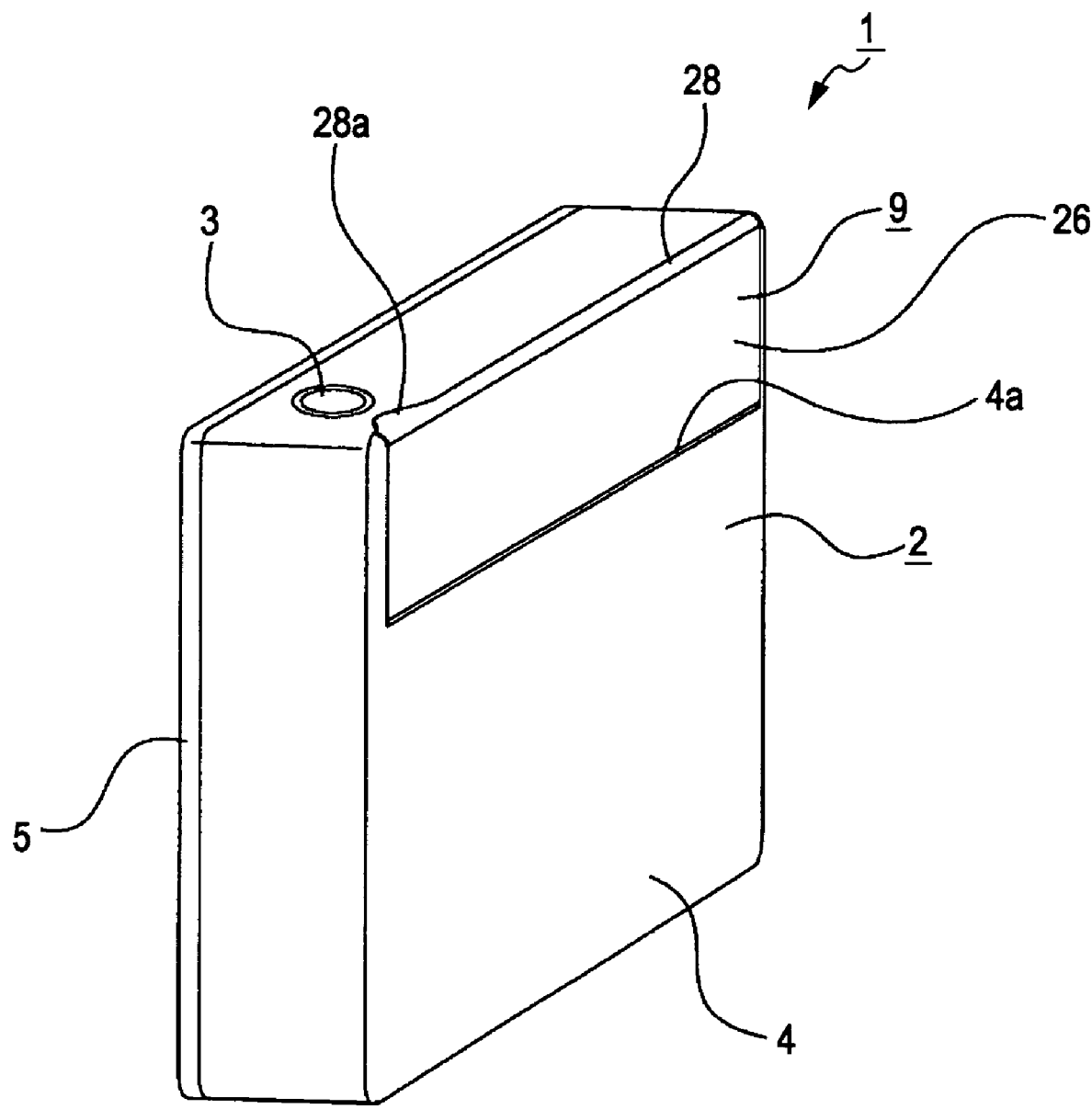
FIG. 1 is a perspective view schematically illustrating an imaging device according to an embodiment of the present invention together with FIGS. 2 to 17.

An imaging device (digital still camera) 1 is formed, for example, in a box shape which is flat in a front and rear direction, and the respective necessary parts are disposed in an outer housing 2 (refer to FIG. 1). A photographing button 3 is disposed on a top surface of the outer housing 2, and a rear surface of the outer housing 2 is provided with various operation portions (not shown) such as a zoom screw, or a display panel (not shown).

Figure 2:
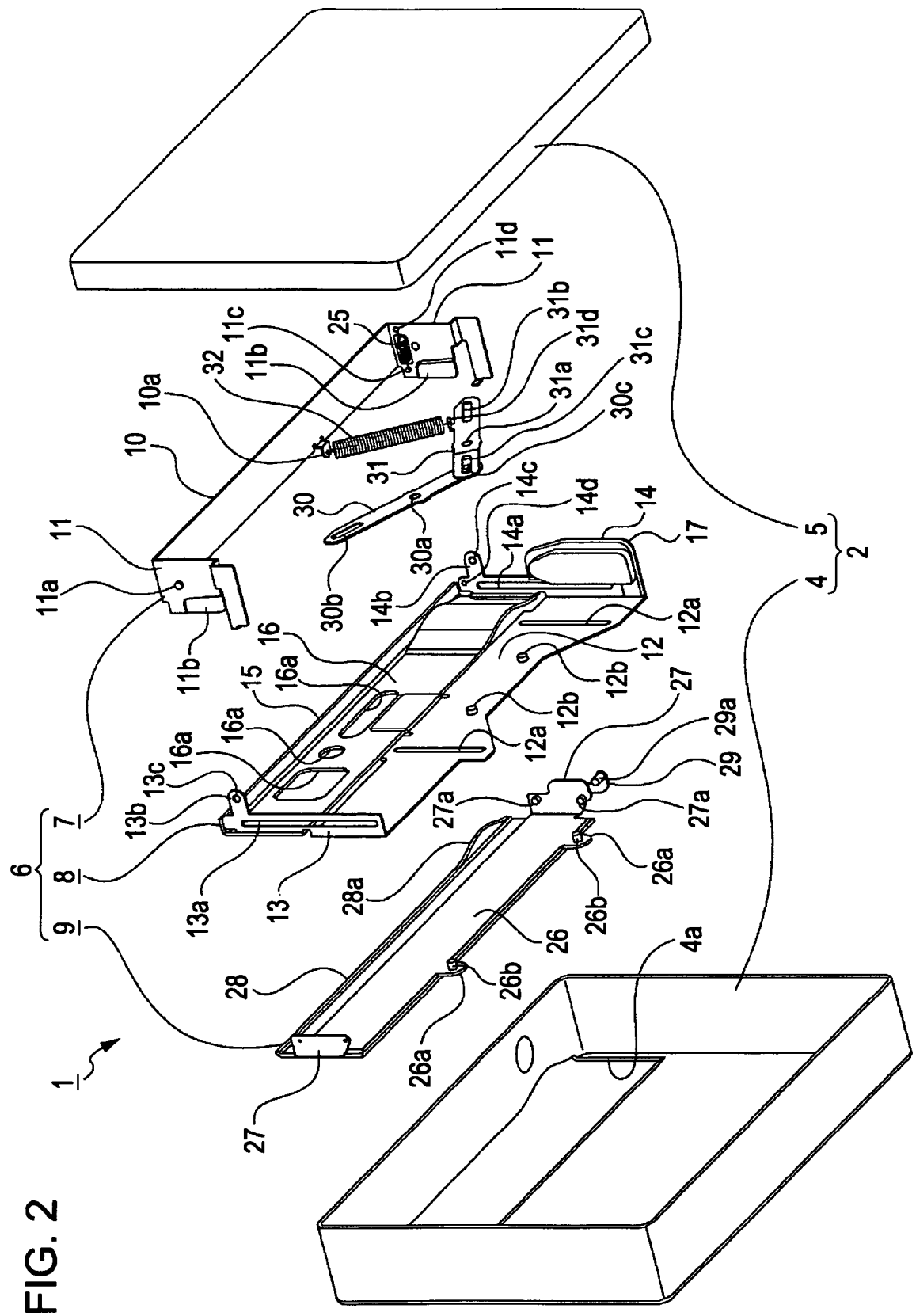
FIG. 2 is an exploded perspective view of an imaging device.

The outer housing 2 includes a front cabinet 4 and a rear panel 5 which are engaged to each other in a forward and rearward direction (refer to FIG. 2). The front side portion of the front cabinet 4 is provided with an arrangement opening 4a at an upper end portion thereof.

[Configuration of Opening/Closing Mechanism]

Figure 3:
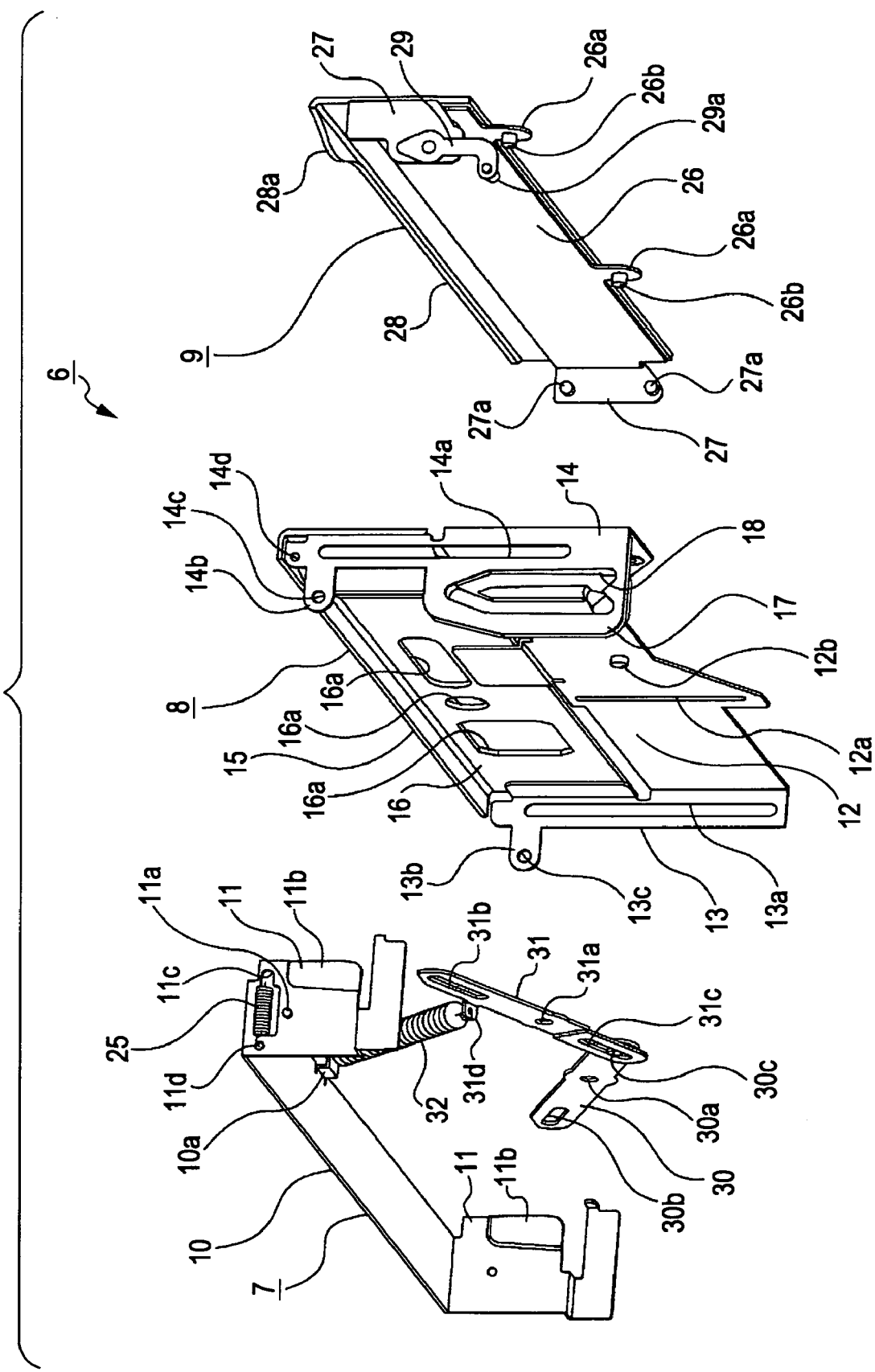
FIG. 3 is an exploded perspective view of an opening/closing mechanism.

An opening/closing mechanism 6 is disposed in the outer housing 2 (refer to FIGS. 2 and 3). The opening/closing mechanism 6 has a tilting base 7, a slide base 8, and a cover 9.

The tilting base 7 has a top side portion 10 facing in an upward and downward direction, and support side portions 11 and 11 each protruding downward from both left and right edges of the top side portion 10.

The top side portion 10 is provided with a spring locking protrusion 10a at a bottom surface thereof.

The support side portions 11 and 11 are provided with support shafts 11a and 11a at an outer surface thereof, respectively. The front edges of the support side portions 11 and 11 are formed as angle restricting edges 11b and 11b which are inclined at an angle so as to be displaced in a rearward direction as it goes downward.

The upper end portion of one support side portion 11 is provided with a spring placement hole 11c, and a spring hanging hole 11d at a rear side of the spring placement hole 11c.

The slide base 8 has a base side portion 12 facing in a forward and rearward direction, a left side portion 13 and a right side portion 14 which respectively protrude rearward from both left and right edges of the base side portion 12, and a top side portion 15 protruding rearward from an upper edge of the base side portion 12.

An upper half portion of the base side portion 12 is installed as an portion to be locked 16 which is opened and closed by the cover 9. The portion to be locked 16 is provided with a plurality of placement holes 16a and 16a, and a photographing lens or a light emitting portion which is not shown is placed in each of the placement holes 16a and 16a. One of left and right end portions of the portion to be locked 16, for example, the right end portion, is provided with a concave portion 16b for operation which extends in an upward and downward direction. The concave portion 16b for operation is opened in a forward direction and an upward direction.

The lower half portion of the base side portion 12 is provided with support holes 12a and 12a which extend in an upward and downward direction and are spaced apart in a left and right direction. The base side portion 12 is provided with support pins 12b and 12b which protrude rearward at positions between the support holes 12a and 12a and are spaced apart in a left and right direction.

The left side portion 13 is provided with a guide hole 13a extending in an upward and downward direction. The upper end portion of the left side portion 13 is provided with a supported protrusion portion 13b protruding rearward. The supported protrusion portion 13b is provided with a support hole 13c.

The right side portion 14 is provided with a guide hole 14a extending in an upward and downward direction. The upper end portion of the right side portion 14 is provided with a supported protrusion portion 14b protruding rearward. The supported protrusion portion 14b is provided with a support hole 14c. The upper end portion of the right side portion 14 is provided with a spring supporting hole 14d.

The lower half portion of the right side portion 14 is provided with a cam forming side portion 17 protruding rearward. The cam forming side portion 17 is provided with a cam groove 18 at an outer surface thereof.

Figure 4:
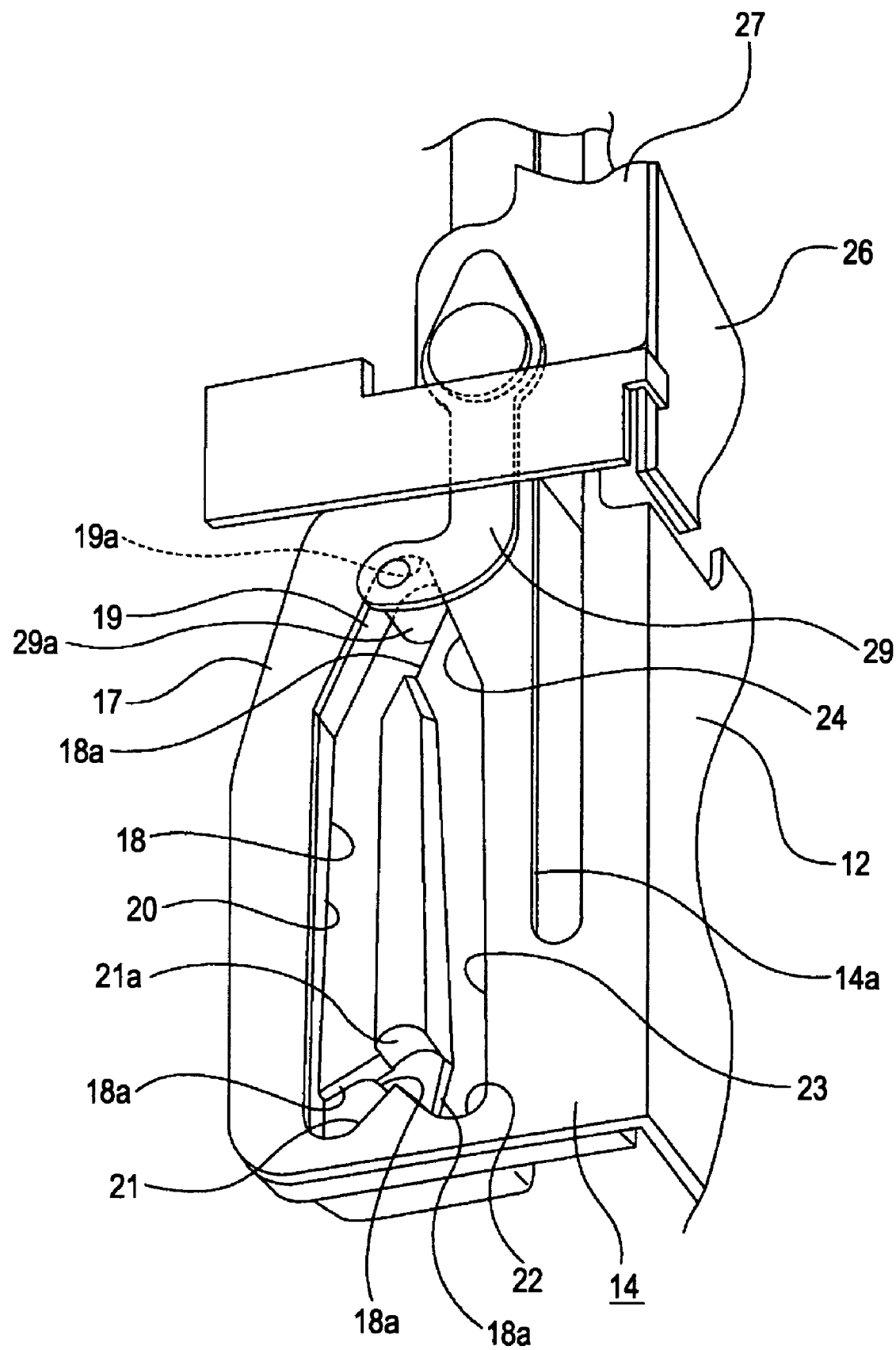
FIG. 4 is an enlarged perspective view illustrating the shape of a cam groove.

The cam groove 18 has a first upper inclined portion 19, a first vertical portion 20, a first lower inclined portion 21, a second lower inclined portion 22, a second vertical portion 23 and a second upward inclined portion 24 which are sequentially and continuously formed in a circular shape, as shown in FIGS. 3 and 4. The first upper inclined portion 19 is inclined to be displaced rearward as it goes down, the first vertical portion 20 extends in an upward and downward direction, and the first lower inclined portion 21 is inclined to be displaced forward as it goes up. The second lower inclined portion 22 is inclined to be displaced forward as it goes down, the second vertical portion 23 extends in an upward and downward direction, and the second upward inclined portion 24 is inclined to be displaced rearward as it goes up.

Each of return-prevention stepped portions 18a and 18a is formed at a position of the lower end side of the first vertical portion 20, a position of the upward end side of the first lower inclined portion 21, a position of the lower end side of the second lower inclined portion 22, and a position of the upper end side of the second upward inclined portion 24. By the return-prevention stepped portions 18a and 18a, the portion of the lower end side of the first vertical portion 20 is positioned at a portion closer to the outside than the lower end portion, the portion of the upper end side of the first lower inclined portion 21 is positioned at a portion closer to the outside than upper end portion, the portion of the lower end side of the second lower inclined portion 22 is positioned at a portion at a portion closer to the outside than the lower end portion, and the upper end side of the second upward inclined portion 24 is positioned at a position closer to the outside than the upper end portion.

The upper end portion of the first upward inclined portion 19 is formed as an upward lock portion 19a, and the upward end portion of the first lower inclined portion 21 is formed as a lower lock portion 21a.

As shown in FIGS. 2 and 3, the support shafts 11a and 11a of the support side portions 11 and 11 are respectively inserted into the support holes 13c and 14c formed in the left side portion 13 and the right side portion 14, so that the slide base 8 is tiltably (rotatably) supported by the tilting base 7.

In a state in which the slide base 8 is supported by the tilting base 7, the first biasing spring 25 is supported between the spring hanging hole 11d formed in the support side portion 11 of the tilting base 7 and the spring support hole 14c formed in the right side portion 14 of the slide base 8. The first biasing spring 25 is placed in the spring placement hole 11c formed in the support side portion 11. The first biasing spring 25 is, for example, a tension coil spring. Accordingly, the slide base 8 is biased in a direction adjacent to the tilting base 7, that is, in a rearward direction, by the first biasing spring 25.

The cover 9 has an opening/closing side portion 26 facing in a forward and rearward direction, supported side portions 27 and 27 each protruding rearward from both left and right edges of the opening/closing side portion 26, and a bent edge 28 protruding rearward from the upper edge of the opening/closing side portion 26.

The opening/closing side portion 26 is provided with supported protruding portions 26a and 26a protruding downward from a lower edge, and the supported protruding portions 26a and 26a are spaced apart from each other in a left and right direction. The supported protruding portions 26a and 26a are provided with coupling shafts 26b and 26b protruding in a rearward direction, respectively.

The supported side portions 27 and 27 are provided at an inner surface thereof with two supported pins 27a and 27a spaced apart from each other in an upward and downward direction, respectively.

The cam arm 29 is rotatably supported on the outer surface of one supported side portion 27. The cam arm 29 is formed in an L-shape, so that the upper end portion serves as a rotation fulcrum, and the lower end has a cam engaging portion 29a at an inner surface thereof. The cam arm 29 is formed by a leaf spring having resilience in a left and right direction.

One end portion of the bent edge 28 in a left and right direction, for example, a right end portion, is provided with a pressing operation portion 28a protruding in a rearward direction. The pressing operation portion 28a is positioned at a position corresponding to the concave portion 16b for operation which is formed in the base side portion 12 of the slide base 8.

The supported pins 27a and 27a of the supported side portions 27 and 27 are respectively inserted from the outside into the guide holes 13a and 14a which are respectively formed in the left side portion 13 and the right side portion 14, so that the cover 9 is slidably supported on the slide base 8. In a state in which the cover 9 is supported on the slide base 8, the cam engaging portion 29a of the cam arm 29 is slidably engaged into the cam groove 18 of the slide base 8.

The cover 9 is penetrated from the forward direction by the coupling shafts 26b and 26b which are respectively inserted into the support holes 12a and 12a of the slide base 8.

Pivot arms 30 and 31 are rotatably supported on the rear surface of the slide base 8, respectively. The pivot arms 30 and 31 are respectively provided with shaft support holes 30a and 31a at an approximate center portion in a longitudinal direction, and connection holes 30b and 31b at one end in a longitudinal direction, the connection holes extending in a longitudinal direction.

The pivot arm 30 is provided at the other end in a longitudinal direction with a connection pin 30c protruding in a rearward direction.

The pivot arm 31 is provided at the other end in a longitudinal direction with a connection hole 31c extending in a longitudinal direction. The spring hanging portion 31d is provided at a position in the vicinity of the connection hole 31b of the pivot arm 31.

The pivot arm 30 and the pivot arm 31 are connected to each other in a state in which the connection pin 30c is inserted into the connection hole 31c in a slidably engaging state.

The support pins 12b and 12b of the base side portion 12 are respectively inserted into the shaft support holes 30b and 31b, so that the pivot arms 30 and 31 are rotatably supported on the slide base 8. Since the pivot arms 30 and 31 are connected to each other, the pivot arms are synchronously rotated.

In the state in which the pivot arms 30 and 31 are supported on the slide base 8, the coupling shafts 26b and 26b of the cover 9 which are respectively inserted into the support holes 12a and 12a of the slide base 8 are inserted into the connection holes 30b and 31b, so that the cover 9 is connected to the pivot arms 30 and 31. The coupling shafts 26b and 26b are slidably engaged with the connection holes 30b and 31b, respectively. Consequently, if the cover 9 is slid in an upward and downward direction with respect to the slide base 8, the pivot arms 30 and 31 are synchronously rotated.

In the state in which the pivot arms 30 and 31 are supported on the slide base 8, a second biasing spring 32 is supported between the spring hanging protrusion 10a provided on the top side portion 10 and the spring hanging portion 31d provided on the pivot arm 31. The second biasing spring 32 is, for example, a tension coil spring. Consequently, the pivot arms 30 and 31 are biased by the second biasing spring 32 in such a direction that each of the ends of the connection hole 30b and the connection hole 31b come close.

The resilience of the second biasing spring 32 is larger than that of the first biasing spring 25.

Since the cover 9 is supported on the slide base 8 which is biased in a rearward direction by the first biasing spring 25, and also is supported on the pivot arm 31 which is biased by the second biasing spring 32, the cover is biased in a rearward direction by the first biasing spring 25 via the slide base 8, and simultaneously is biased in an upward direction by the second biasing spring 32 via the pivot arm 31.

[Operation of Opening/Closing Mechanism]

The operation of the opening/closing mechanism 6 will now be described (refer to FIGS. 5 to 17).

First, the state in which the cover 9 is maintained at a closed position will be described.

The cover 9 is biased in a rearward direction by the first biasing spring 25 via the slide base 8, and simultaneously is biased in an upward direction by the second biasing spring 32 via the pivot arm 31, so that the cover is maintained at the closed position.

Figure 5:
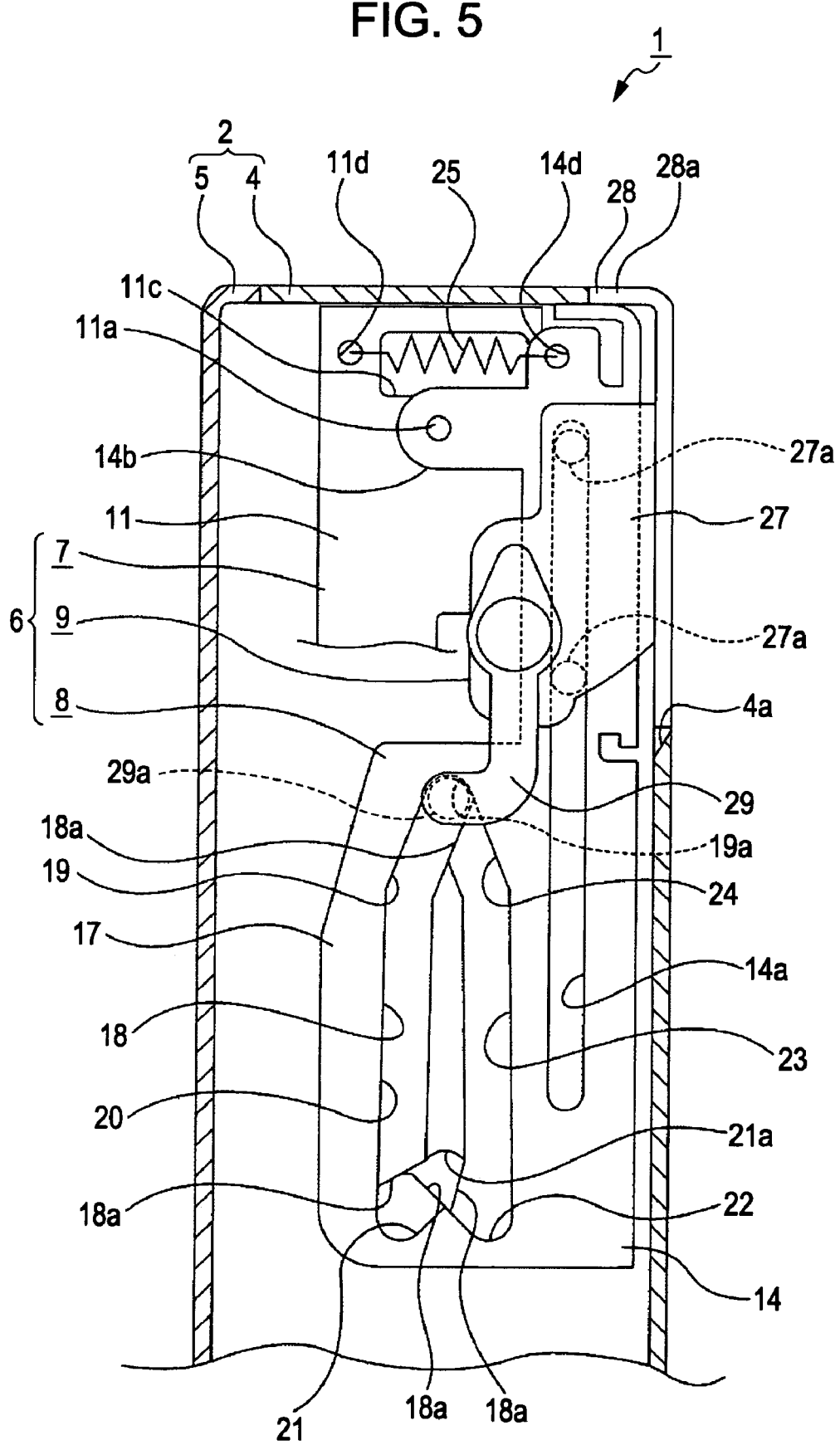
FIG. 5 is a side view of an opening/closing mechanism to illustrate the operation of the opening/closing mechanism together with FIGS. 6 to 17, in a state in which a cover is placed at a closed position.
Figure 6:
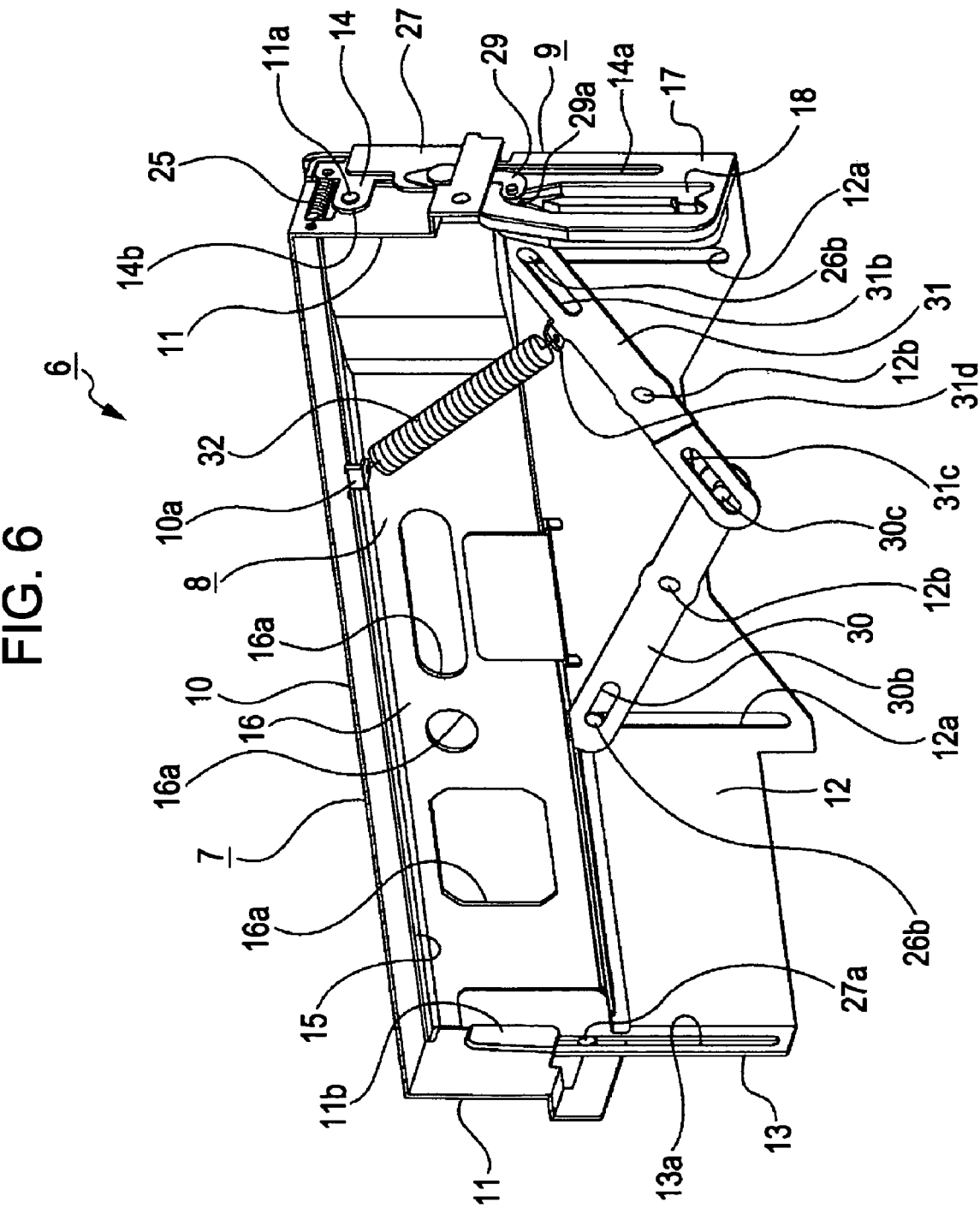
FIG. 6 is an enlarged perspective view illustrating a state of a pivot arm in a state in which a cover is at a closed position.
Figure 7:
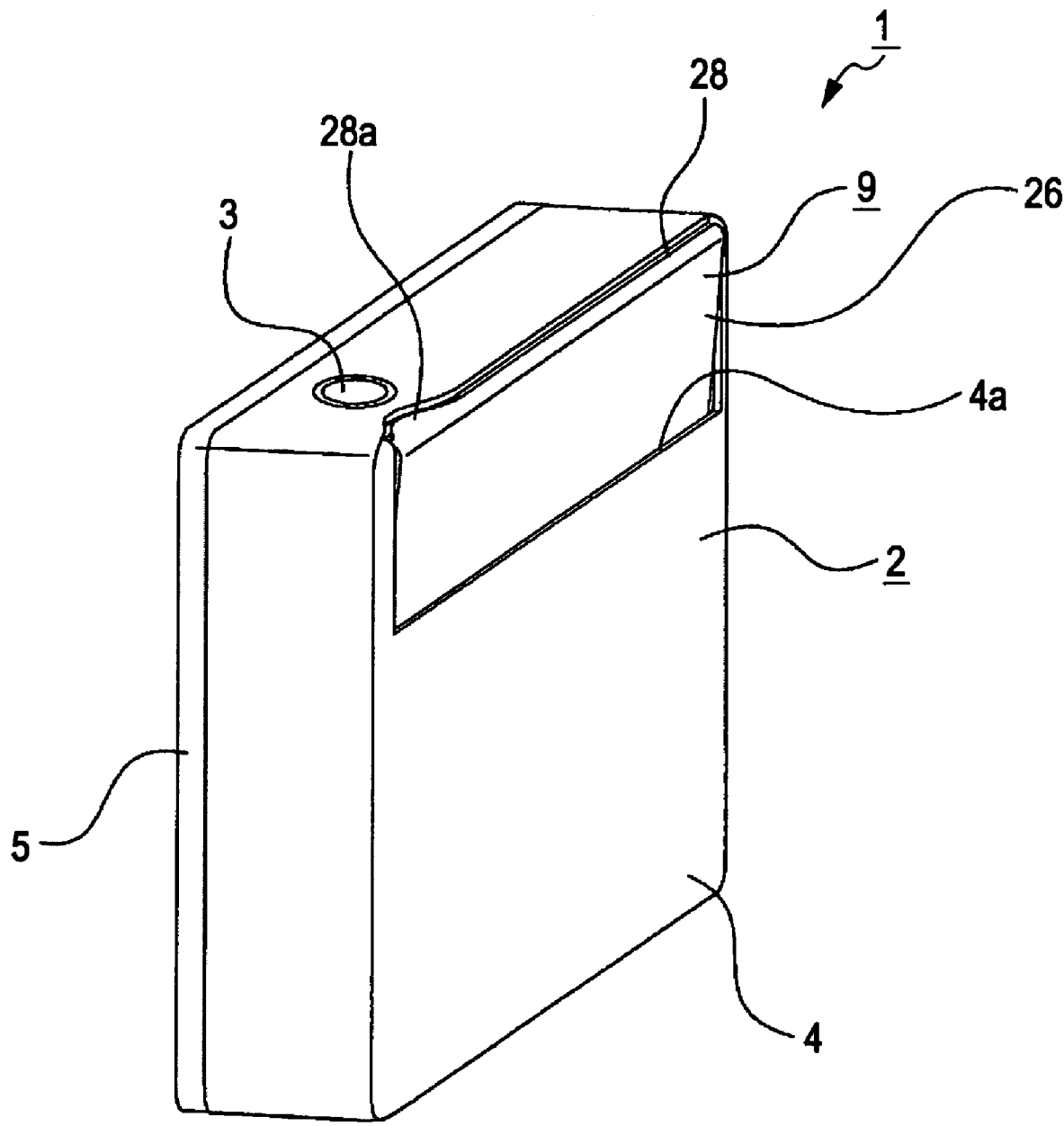
FIG. 7 is a perspective view schematically illustrating the operation of a cover moving from a closed position to an open position together with FIGS. 8 to 13, in a state in which the cover is tilted to an inclined position.
Figure 8:
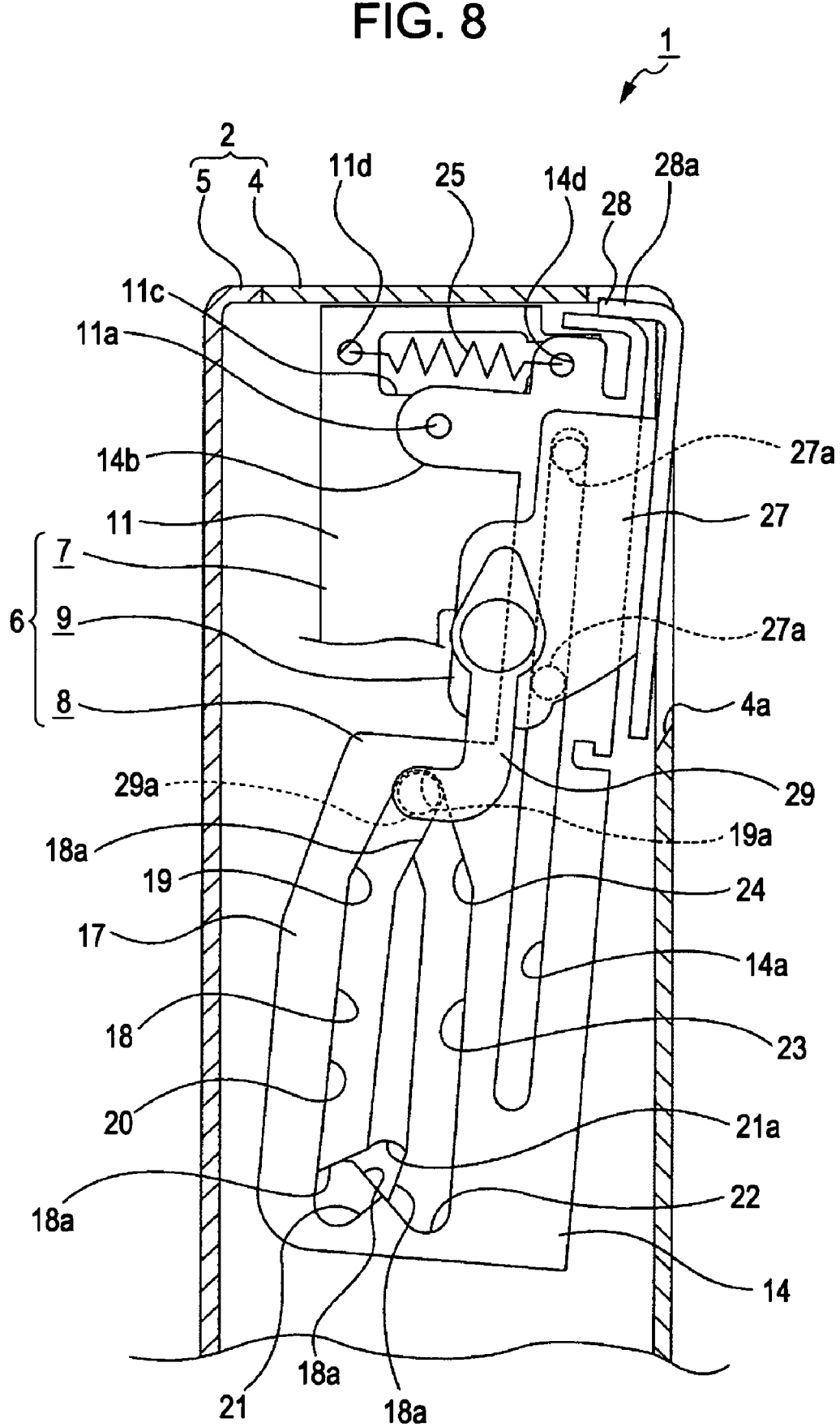
FIG. 8 is a side view illustrating an opening/closing mechanism in a state in which a slide base and a cover are tilted to a tilted position and an inclined position.

At the closed position, as shown in FIG. 5, the cover 9 is positioned at the upper end in a moving direction, and the opening/closing side portion 26 is in a vertical state, so that the portion to be locked 16 of the slide base 8 is closed (refer to FIG. 1). Consequently, the photographing lens or the light emitting portion which is placed in the displacement holes 16a and 16a of the portion to be locked 16 is closed.

The cam engaging portion 29a provided on the cam arm 29 of the cover 9 is engaged with the upper locking portion 19a formed in the cam groove 18 of the slide base 8, so that the cover 9 is locked at the closed position.

Since the cover 9 is positioned at the upper end portion in the moving direction, each of the supported pins 27a and 27a is engaged with the guide holes 13a and 14a of the slide base 8.

Since the opening/closing side portion 26 of the cover 9 is in the vertical state, the base side portion 12 of the slide base 8 supporting the cover 9 is also in the vertical state, and thus is maintained at an initial position.

Since the cover 9 is positioned at the upper moving end portion, each of the connection shafts 26b and 26b is engaged with the upper end portion of the respective support holes 12a and 12a formed in the base side portion 12 of the slide base 8. Accordingly, the pivot arms 30 and 31 connected to the connection shaft 26b and 26b are maintained in a V-shape (refer to FIG. 6).

Next, the operation of the cover 9 from the closed position to the open position will be described (refer to FIGS. 7 to 13).

If the pressing operation portion 28a of the cover 9 is pressed in a downward direction in the state in which the cover 9 is maintained at the closed position, the pressing operation portion 28a is positioned at a position spaced apart from the support shaft 11a, which is the rotation fulcrum with respect to the tilting base 10 of the slide base 8, at a predetermined distance, so that rotational moment is generated at the slide base 8 and the cover 9 supported on the slide base 8. Accordingly, the slide base 8 and the cover 9 are rotated (tilted) integrally around the support shafts 11a and 11a as a fulcrum with respect to the tilting base 7 against the biasing force of the first biasing spring 25 (refer to FIGS. 7 and 8).

When the slide base 8 and the cover 9 are tilted as described above, the inner surface of the base side portion 12 of the slide base 8 comes into contact with the angle restriction edges 11b and 11b formed on the support side portions 11 and 11 of the tilting base 7, so that the slide base 8 and the cover 9 are respectively maintained at the tilted position and the inclined position.

In this instance, since the first biasing spring 25 has resilience smaller than that of the second biasing spring 32, the first biasing spring 25 is extended, while the second biasing spring 32 is not nearly extended. Therefore, the slide base 8 is tilted to the tilted position, so that the cover 9 is tilted to the inclined position.

If the cover 9 is tilted to the inclined position, the lower end portion of the cover 9 is positioned at a position closer to the inside than the front side portion of the outer housing 2.

Figure 9:
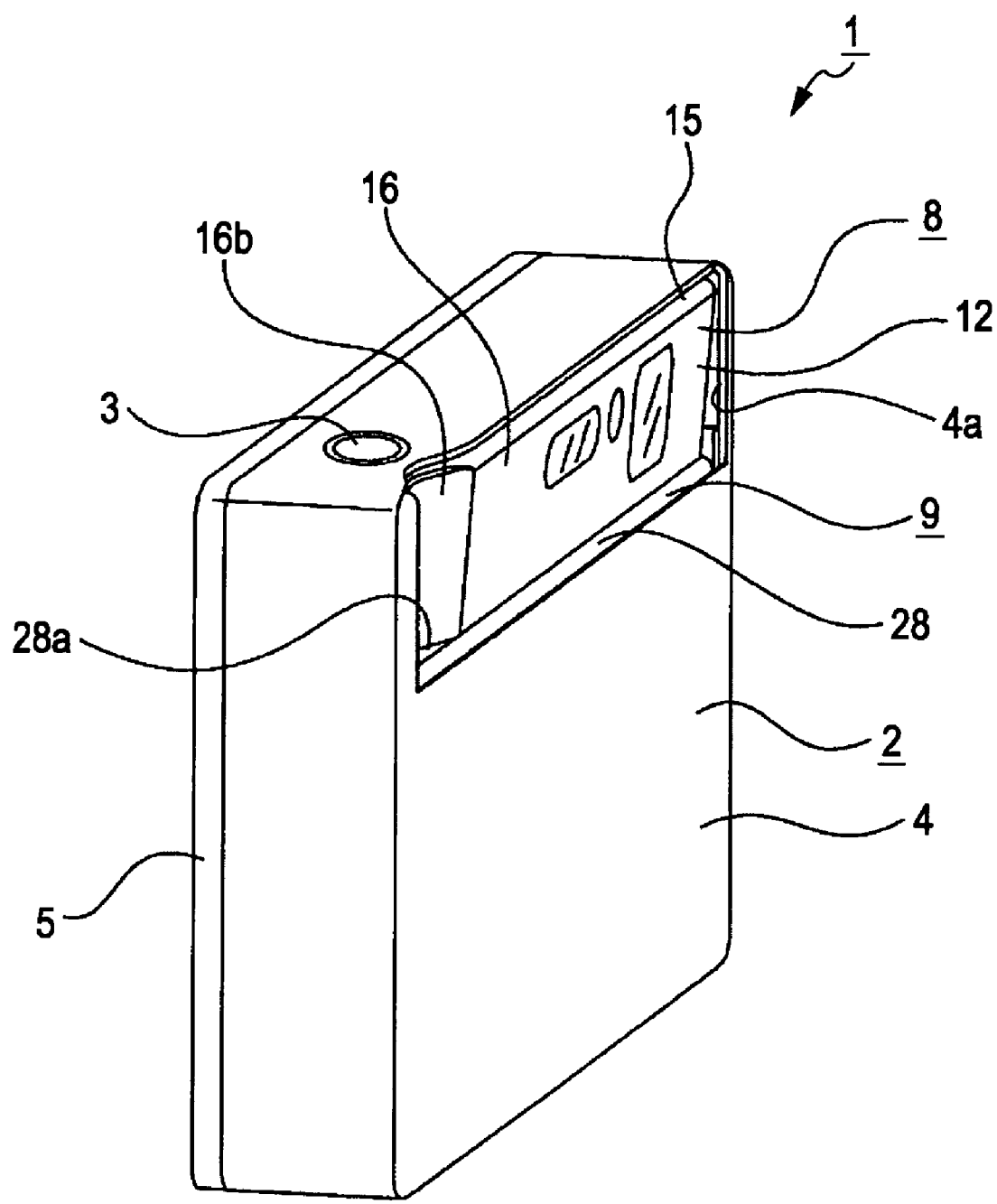
FIG. 9 is a perspective view schematically illustrating a state in which a cover is further slid to a lowest end.
Figure 10:
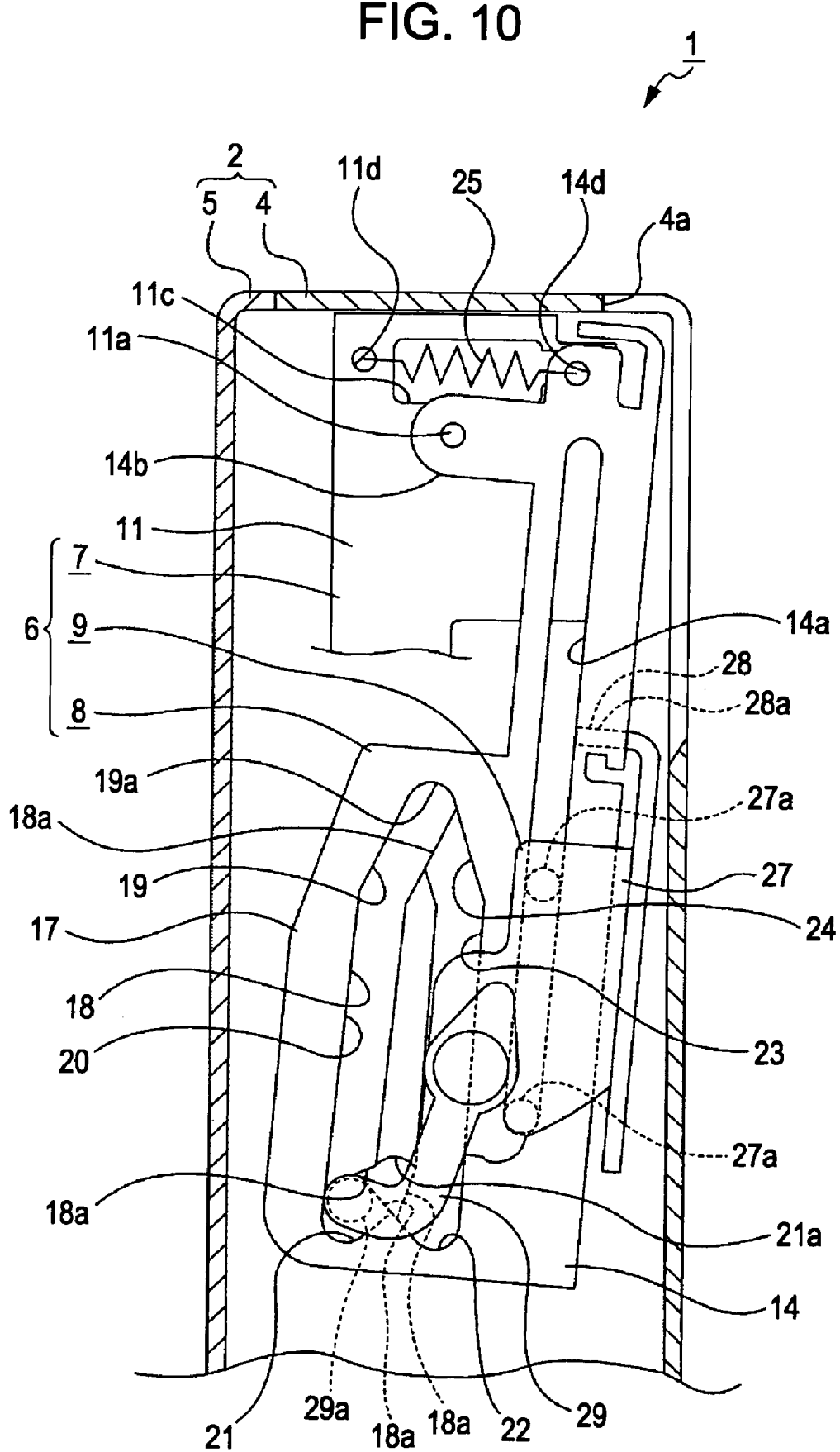
FIG. 10 is a side view illustrating an opening/closing mechanism in a state in which a cover is further slid to a lowest end.

If the pressing operation portion 28a of the cover 9 is continuously pressed downward, the cover 9 is slid and moved downward with respect to the slide base 8 against the biasing force of the second biasing spring 32 (refer to FIGS. 9 and 10). The movement of the cover 9 with respect to the slide base 8 is performed while the supported pins 27a and 27a are guided along the guide holes 13a and 14a of the slide base 8.

If the cover 9 is moved downward, the cover 9 is received in the outer housing 2. In this instance, the cover 9 is approximately moved downward along the inner surface in a front side portion of a front cabinet 4.

If the cover 9 is moved downward, the pressing operation portion 28a is moved downward along the concave portion 16b for operation of the portion to be locked 16. In addition, as the cover 9 is moved downward, the coupling shafts 26b and 26b are guided and moved downward along the support holes 12a and 12a of the base side portion 12. Accordingly, the pivot arms 30 and 31 are synchronously rotated around the support pins 12b and 12b as a fulcrum.

In accordance with the downward movement of the cover 9, the cam engaging portion 29a is slid along the cam groove 18 from the first upper inclined portion 19 to the first vertical portion 20. In this instance, the cam arm 29 is made of a leaf spring, and is biased in such a direction that the cam engaging portion 29a is pressed to the cam groove 18, so that the cam engaging portion 29a is not released from the cam groove 18. In addition, since the cam groove 18 is provided with the return-prevention stepped portions 18a and 18a, the cam engaging portion 29a is not possibly moved along a path contrary to a predetermined path.

When the cam engaging portion 29a is slid on the cam groove 18, the cam arm 29 is rotated with respect to the supported side portion 27 along the engaging position of the cam engaging portion 29a with respect to the cam groove 18.

When the cam engaging portion 29a is slid till the lower end portion of the first vertical portion 20, the pressing operation portion 28a is positioned at the lower end portion of the placement opening 4a formed in the front cabinet 4 of the outer housing 2, and thus is in a state in which the pressing operation portion 28a is not further pressed downwardly.

Figure 11:
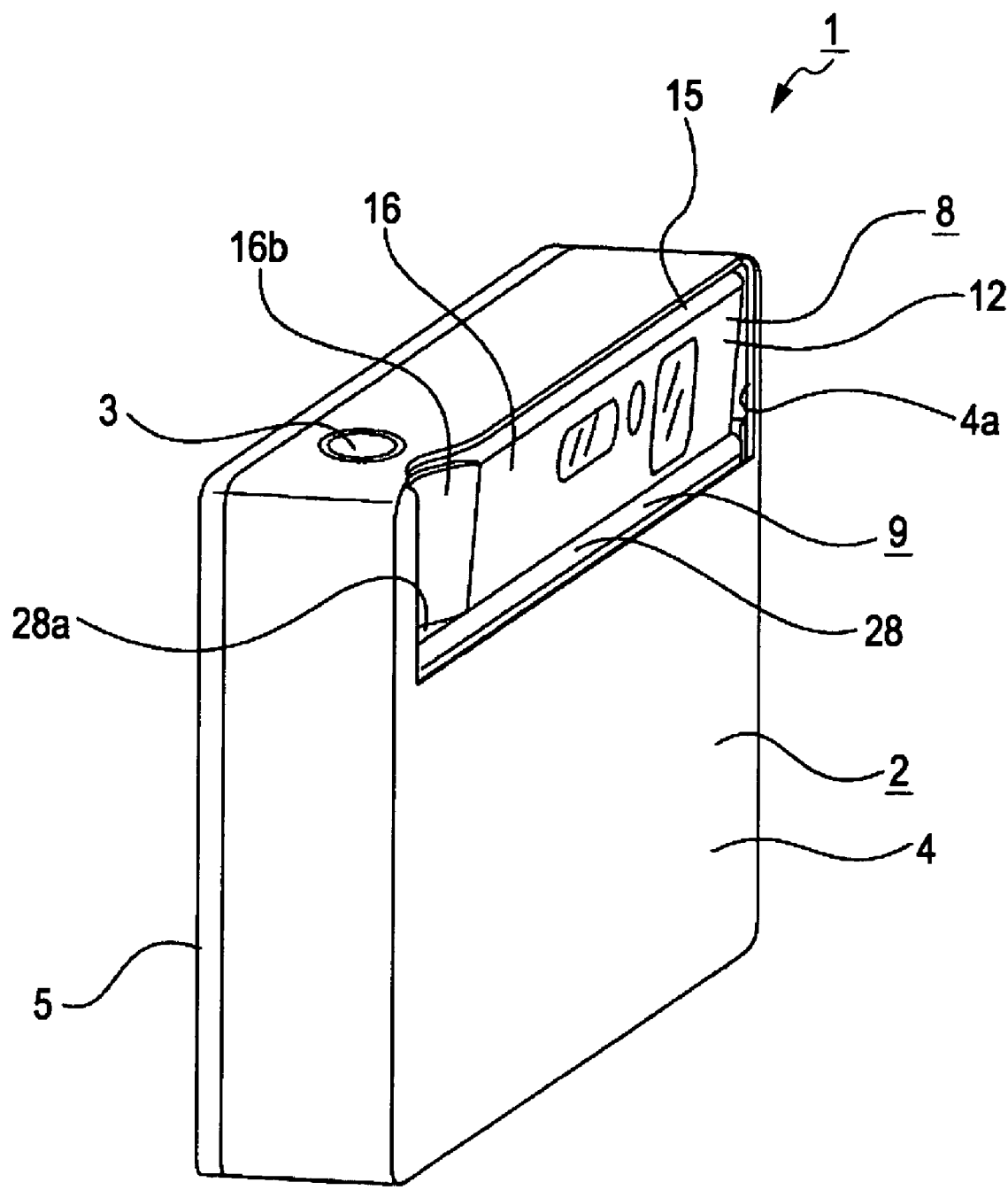
FIG. 11 is a perspective view schematically illustrating a state in which a cover is maintained at an open position.
Figure 12:
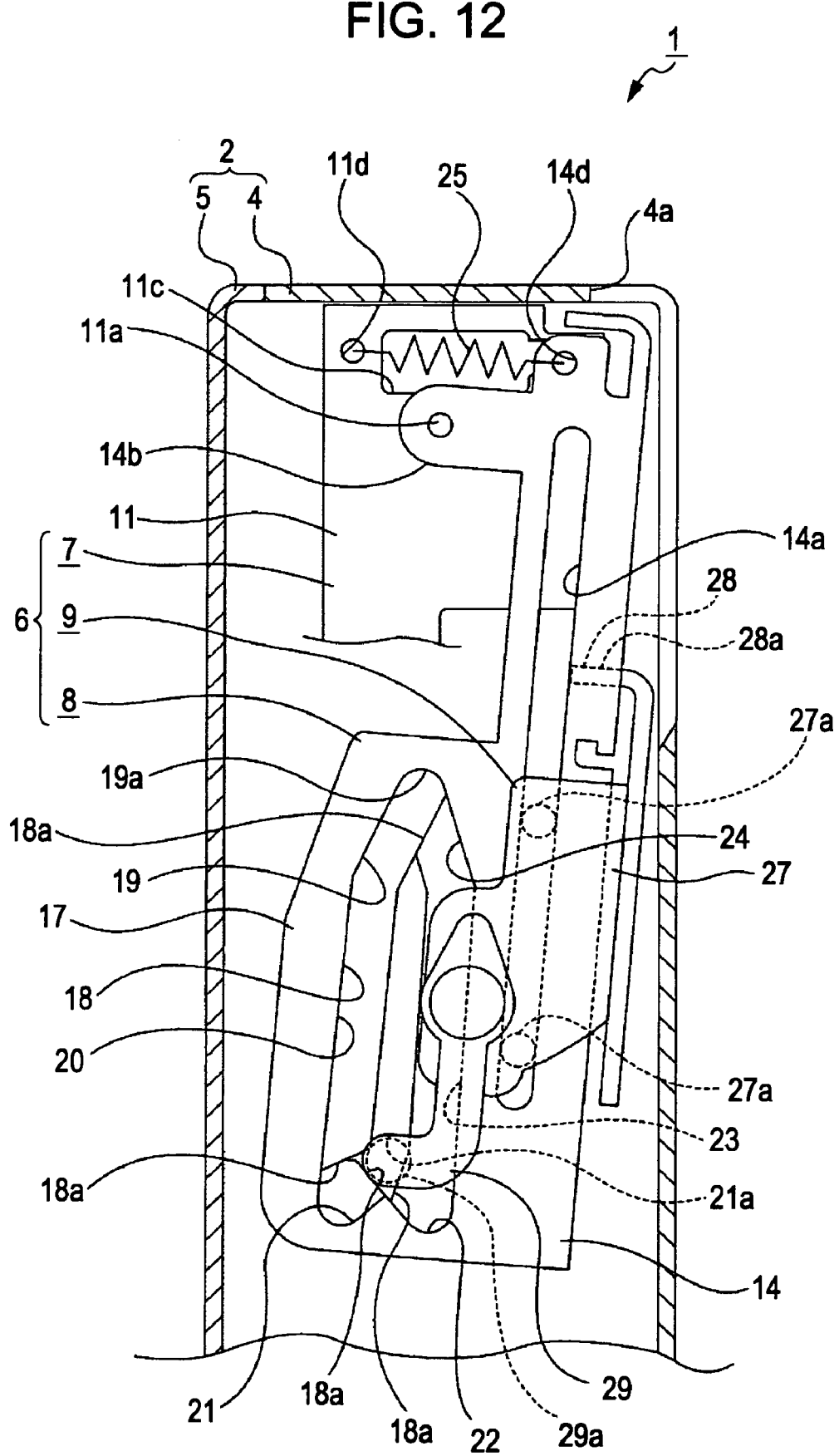
FIG. 12 is a side view illustrating an opening/closing mechanism in a state in which a cover is maintained at an open position.

Then, if the downward pressing of the cover 9 with respect to the pressing operation portion 28a is released, the cover 9 is slid and moved upward with respect to the slide base 8 by the biasing force of the second biasing spring 32 (refer to FIGS. 11 and 12).

If the cover 9 is moved upward, the cam engaging portion 29a is slid along the cam groove 18 from the lower end portion of the first vertical portion 20 to the upper end portion of the first lower inclined portion 21, and thus is locked to the lower locking portion 21a. Accordingly, the upward movement of the cover 9 is stopped, and thus is maintained at the open position. In this instance, since the cover 9 is moved to a position slightly upward than the lowest end portion in the movement range, the pressing operation portion 28a is placed at a position slightly upper than the lower edge of the placement opening 4a, and thus is in the state in which the pressing operation portion 28a is pressed downwardly.

Figure 13:
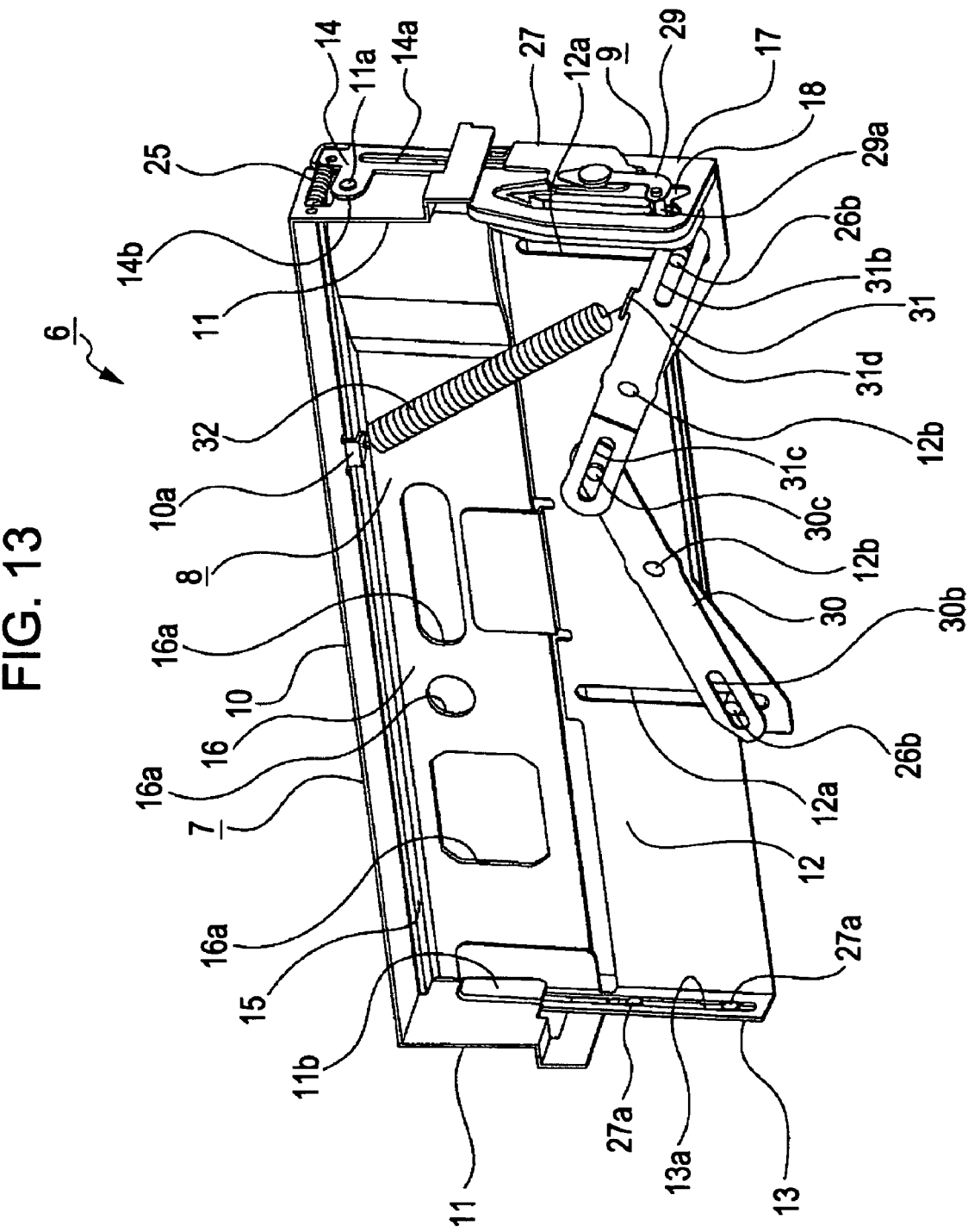
FIG. 13 is an enlarged perspective view illustrating a pivot arm in a state in which a cover is at an open position.

In the state in which the cover 9 is maintained at the open position, the coupling shafts 26b and 26b are engaged at the position corresponding to the lower end portions of the support holes 12a and 12a, and the pivot arms 30 and 31 coupled to the coupling shafts 26b and 26b are maintained in the inversed-V shape (refer to FIG. 13).

In the state in which the cover 9 is at the open position, the portion to be locked 16 is opened, so that the photographing lens or the light emitting portion placed in the displacement holes 16a and 16a is in a usable state.

Next, the operation of the cover 9 from the open position to the closed position will be described (refer to FIGS. 14 to 17).

Figure 14:
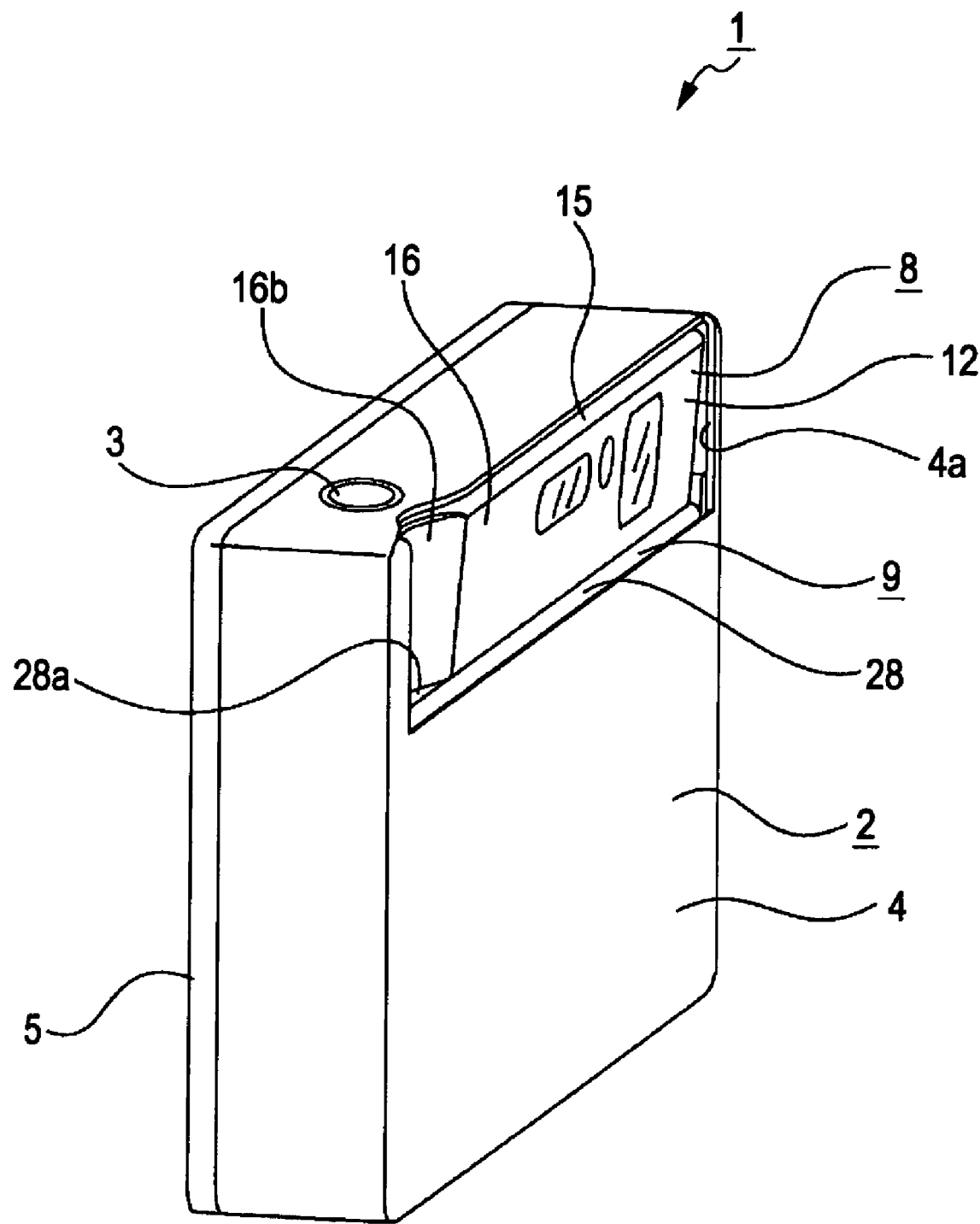
FIG. 14 is a perspective view schematically illustrating the operation of a cover moving from an open position to a closed position together with FIGS. 15 to 17, in a state in which the cover is further slide to a lowest end.
Figure 15:
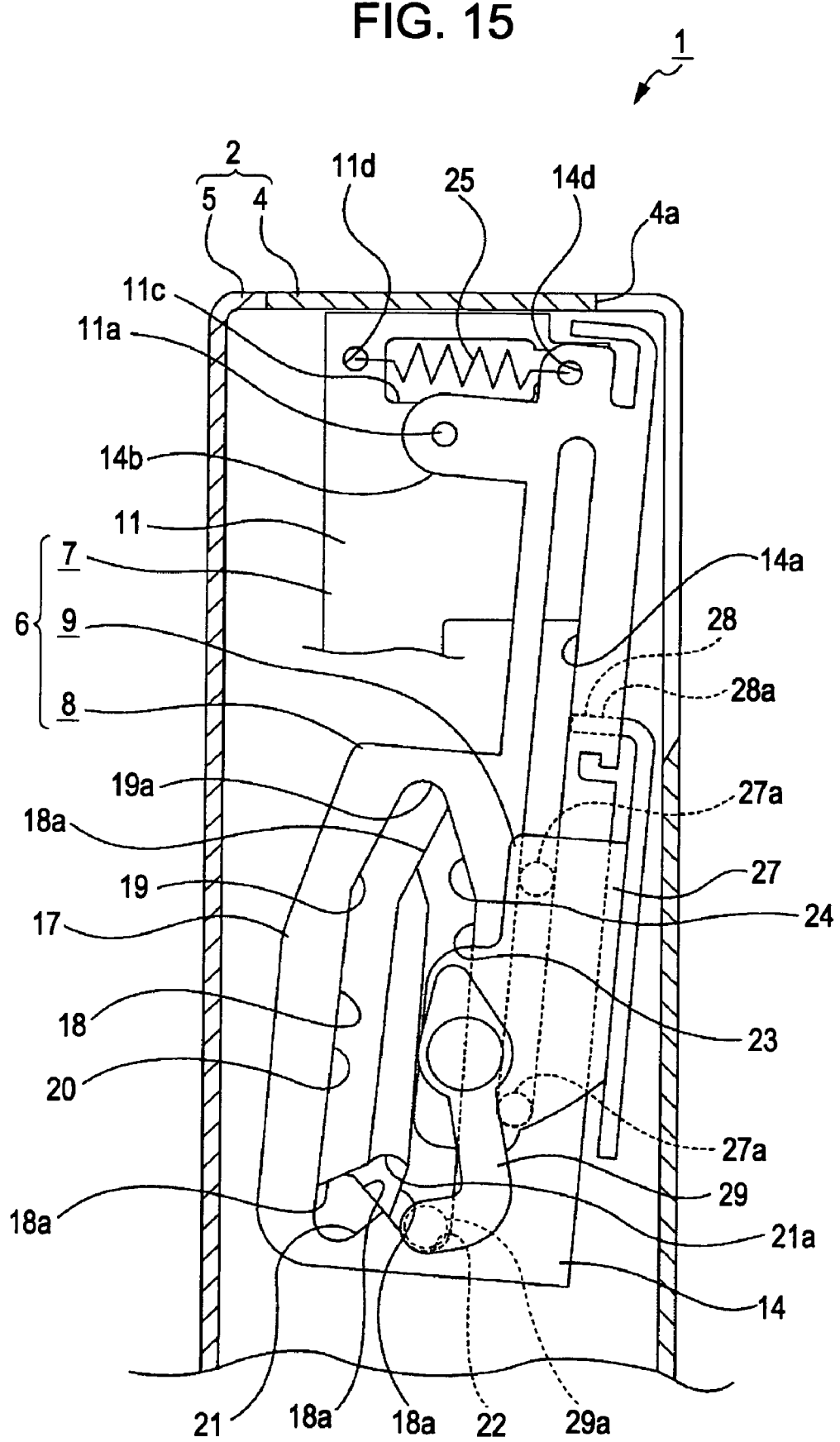
FIG. 15 is a side view illustrating an opening/closing mechanism in a state in which a cover is further slid to a lowest end.

If the pressing operation portion 28a of the cover 9 is pressed downward in the state in which the cover 9 is maintained at the open position, the cover 9 is slid and moved downward with respect to the slide base 8 against the biasing force of the second biasing spring 32 (refer to FIGS. 14 and 15). The movement of the cover 9 with respect to the slide base 8 is performed while the supported pins 27a and 27a are guided along the guide holes 13a and 14a of the slide base 8.

If the cover 9 is moved downward, the cam engaging portion 29a is slid along the cam groove 18 from the upper end portion of the first lower inclined portion 21, that is, the second lower locking portion 21a to the lower end portion of the second lower inclined portion 22.

When the cam engaging portion 29a is slid to the lower end portion of the second lower inclined portion 22, the pressing operation portion 28a is positioned at the lower end portion of the placement opening 4a formed in the front cabinet 4 of the outer housing 2, and thus is in a state in which the pressing operation portion 28a is not further pressed downwardly.

Figure 16:
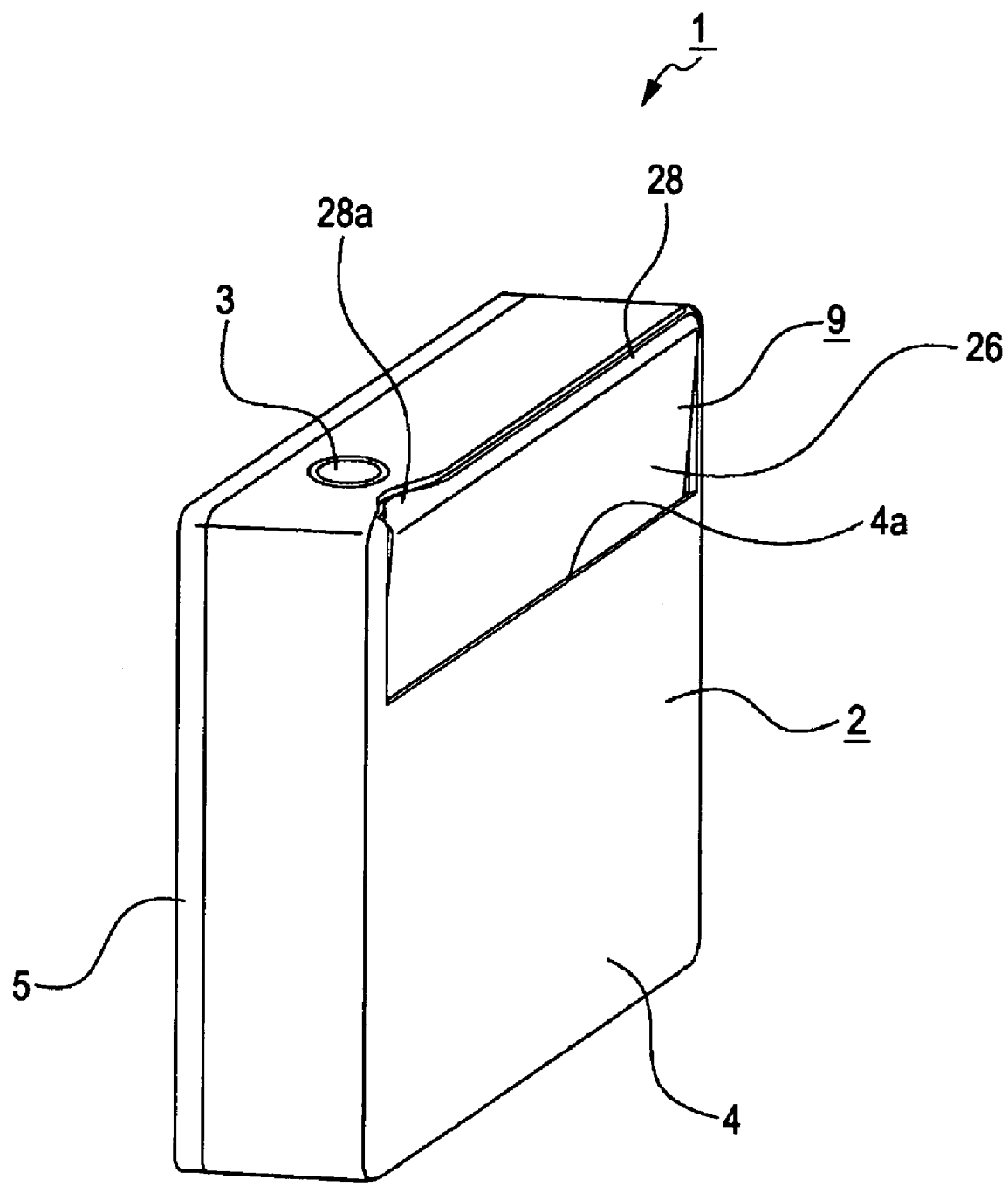
FIG. 16 is a perspective view schematically illustrating a state in which a cover is slid to an inclined end.
Figure 17:
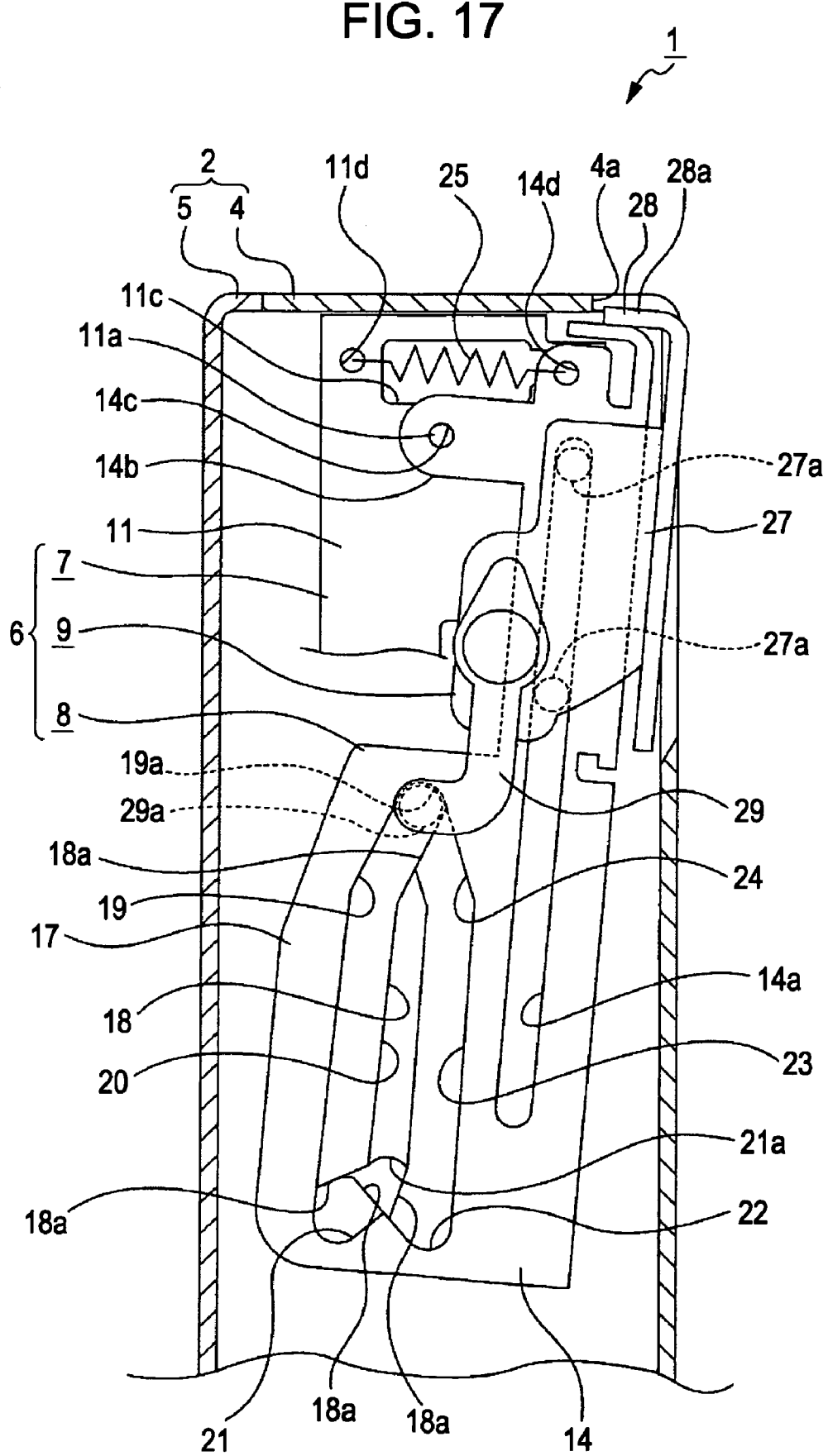
FIG. 17 is a side view illustrating an opening/closing mechanism in a state in which a cover is slid to an inclined position.

Then, if the downward pressing of the cover 9 with respect to the pressing operation portion 28a is released, the cover 9 is slid and moved upward with respect to the slide base 8 by the biasing force of the second biasing spring 32 (refer to FIGS. 16 and 17).

If the cover 9 is moved upward, the pressing operation portion 28a is moved upward along the concave portion 16b for operation of the portion to be locked 16, and the coupling shafts 26b and 26b are guided to the support holes 12a and 12a of the base side portion 12 in accordance with the upward movement of the cover 9. Consequently, the pivot arms 30 and 31 are synchronously rotated around the support pins 12b and 12b as a fulcrum.

If the cover 9 is moved upward, the cam engaging portion 29a is slid along the cam groove 18 from the lower end portion of the second inclined portion 22 to the upper end portion of the first upper inclined portion 19 via the second vertical portion 23 and the second upward inclined portion 24, and thus is locked to the upper locking portion 19a. Accordingly, the cover 9 is moved to the inclined position.

When the cover 9 is moved to the inclined position, the cover 9 is in the state in which it is not possible to be moved upward, the slide base 8 and the cover 9 are rotated (tilted) in integral around the support shafts 11a and 11a as a fulcrum with respect to the tilting base 7 by the biasing force of the first biasing spring 25. Accordingly, the slide base 8 and the cover 9 are respectively maintained at the initial position and the closed position (refer to FIGS. 1 and 5).

In the state in which the cover 9 is maintained at the closed position, the coupling shafts 26b and 26b are engaged with the upper end portions of the support holes 12a and 12a. Accordingly, the pivot arms 30 and 31 coupled to the coupling shafts 26b and 26b are maintained in the V shape (refer to FIG. 6).

In the state in which the cover 9 is at the closed position, the portion to be locked 16 is closed, so that the photographing lens or the light emitting portion placed in the displacement holes 16a and 16a is in an unusable state.

As the above description, according to the imaging device 1, since the cover 9 is moved from the closed position to the open position and then is received in the outer housing 2, the front side portion of the outer housing 2 does not exist between the cover 9 and the slide base 8 thereby to facilitate the operation of the cover 9.

In addition, since the movement of the cover 9 between the open position and the closed position is usually performed by the pressing operation applied to the pressing operation portion 28a in one direction, appropriate operability of the pressing operation can be attained.

Moreover, since the cover 9 is not slid at the front side of the outer housing 2, there is no protrusion portion protruding from the front side of the outer housing 2, thereby securing proper appearance of the imaging device 1.

In addition, after the cover 9 is tilted from the closed position to the inclined position, the cover is approximately moved along the inner surface in the front side portion of the front cabinet 4 and then is received in the outer housing 2. As a result, the receiving space of the cover 9 in the outer housing 2 becomes a minimum size, thereby promoting miniaturization of the imaging device 1.

Further, the resilience of the second biasing spring 32 biasing the cover 9 from the open position to the closed position is set to be higher than that of the first biasing spring 25 biasing the slide base 8 and the cover 9. Accordingly, after the tilting operation of the slide base 8 and the cover 9, the sliding operation of the cover 9 can be reliably performed by a simple mechanism.

Moreover, the pivot arms 30 and 31 which are connected to each other connect the slide base 8 and the cover 9, and are rotatably supported on the slide base 8. Accordingly, even though the pressing operation portion 28a is formed at any position of the cover 9 in a left and right direction, the pressure of the pressing operation portion 28a is easily and uniformly applied to the pivot arms 30 and 31, thereby facilitating the operation of the slide base 8 and the cover 9.

In addition, according to the imaging device 1, the tilting base 7, the slide base 8 and the cover 9 are installed, the pivot arms 30 and 31 which are rotatably connected to each other are rotatably supported by the slide base 8, and the first biasing spring 25 and the second biasing spring 32 are installed. Consequently, the operation of the slide base 8 and the cover 9 can be smoothly and reliably performed by a simple mechanism.

In this instance, when the pressing operation portion 28a is pressed in the state in which the cover 9 is maintained at the closed position, a pressing finger is inserted and guided in the concave portion 16b for operation formed in the portion to be locked 16. In addition, when the pressing operation portion 28a is pressed in the state in which the cover 9 is maintained at the open position, the operation can be performed in a state in which the finger is inserted into the concave portion 16b for operation formed in the portion to be locked 16.

Therefore, appropriate operability can be attained by the concave portion 16b for operation formed in the portion to be locked 16 at the time of pressing the pressing operation portion 28a.

In addition, according to the imaging device 1, the cam engaging portion 29a of the cam arm 29 which is slidably engaged with the cam groove 18 is engaged with the upper locking portion 19a or the lower locking portion 21a of the cam groove 18, so that the cam engaging portion serves as a locking portion for locking the cover 9 at the closed position or the open position.

Accordingly, it is not necessary to install a dedicated locking portion for locking the cover 9 at the closed position or the open position, thereby reducing the number of components and simplifying the mechanism.

In this instance, although an example in which two pivot arms 30 and 31 are installed is described in the above description, the number of the pivot arms is not limited to, two, and three or more may be provided.

In addition, although the object to be opened and closed by the cover 9 is described by way of the photographing lens or light emitting portion, the object to be opened or closed by the cover 9 may be, for example, a display portion such as a liquid crystal panel, an operation portion such as a button or a screw, a connection terminal portion such as a connector, or an insertion portion such as a record medium of a record disc or memory card.

The present application contains subject matter related to that disclosed in Japanese Priority Patent Application JP 2009-149890 filed in the Japan Patent Office on Jun. 24, 2009, the entire content of which is hereby incorporated by reference.

The specific shapes and structures of the respective units described in the embodiment are only examples of embodiments in realizing the invention. The technical scope of the present invention should not be interpreted as limited by the shapes and the structures.

What is claimed is:

1. An opening/closing mechanism for a cover comprising:
a cover that is moved between a closed position and an inclined position in such a manner that the cover is inclined with respect to an outer housing of an imaging device, is operated in a straight line with respect to the outer housing, is moved the inclined position and an open position, and has a pressing operation portion and an portion to be locked;
a slide base that supports the cover slidably between the inclined position and the open position, and has a locking portion which is engaged with the portion to be locked to lock the cover at the open position; and
a tilting base that supports the slide base tiltably between an initial position and a tilted position;
wherein when the cover is placed at the closed position, the slide base is placed at the initial position;
when the pressing operation portion of the cover is pressed in a predetermined pressing direction at the closed position, the slide base is moved to the tilted position, and simultaneously the cover is received in the outer housing through the inclined position, and then is moved to and locked at the open position; and
when the pressing operation portion of the cover is pressed in the pressing direction at the open position, the locking portion is released, and the cover is moved to the closed position through the inclined position, and simultaneously the slide base is moved from the tilted position to the initial position.

2. The opening/closing mechanism for the cover according to claim 1, further comprising:
a first biasing spring for biasing the slide base from the tilted position to the initial position; and
a second biasing spring for biasing the cover from the open position to the closed position;
wherein resilience of the second biasing spring is higher than that of the first biasing spring.

3. The opening/closing mechanism for the cover according to claim 1, wherein the slide base is provided with a cam groove having the locking portion;
the cover is provided with a cam arm having a cam engaging portion which is slidably engaged with the cam groove; and
the cam arm is formed of a leaf spring having a biasing force in a direction of pressing the cam engaging portion toward the cam groove.

4. The opening/closing mechanism for the cover according to claim 1, further comprising:
a plurality of pivot arms connecting the cover and the slide base and rotatably supported on the slide base;
wherein the plurality of pivot arms is rotatably connected to each other; and
when the pressing operation portion of the cover is pressed in the pressing direction, the plurality of pivot arms is synchronously rotated with respect to the slide base.

5. The opening/closing mechanism for the cover according to claim 2, further comprising:

a plurality of pivot arms connecting the cover and the slide base and rotatably supported on the slide base;

wherein the plurality of pivot arms is rotatably connected to each other;

the tilting base is fixed to the outer housing;

the first biasing spring is supported between the tilting base and the slide base; and the second biasing spring is supported between the tilting base and the pivot arms.

6. The opening/closing mechanism for the cover according to claim 1, wherein the slide base is provided with a concave portion for operation which serves as a path of the pressing operation portion when the pressing operation portion is pressed and the cover is slid with respect to the slide base.

7. An imaging device comprising:

an outer housing in which predetermined parts are placed;

a cover that is moved between a closed position and an inclined position in such a manner that the cover is inclined with respect to the outer housing, is operated in a straight line with respect to the outer housing, is moved the inclined position and an open position, and has a pressing operation portion and an portion to be locked;

a slide base that supports the cover slidably between the inclined position and the open position, and has a locking portion which is engaged with the portion to be locked to lock the cover at the open position; and a tilting base that supports the slide base tiltably between an initial position and a tilted position;

wherein when the cover is placed at the closed position, the slide base is placed at the initial position;

when the pressing operation portion of the cover is pressed in a predetermined pressing direction at the closed position, the slide base is moved to the tilted position, and simultaneously the cover is received in the outer housing through the inclined position, and then is moved to and locked at the open position; and when the pressing operation portion of the cover is pressed in the pressing direction at the open position, the locking portion is released, and the cover is moved to the closed position through the inclined position, and simultaneously the slide base is moved from the tilted position to the initial position.

* * * * *